May 10, 1966  S. E. HAGGARD  3,251,028
GEOPHONE
Filed Aug. 8, 1963  2 Sheets-Sheet 1
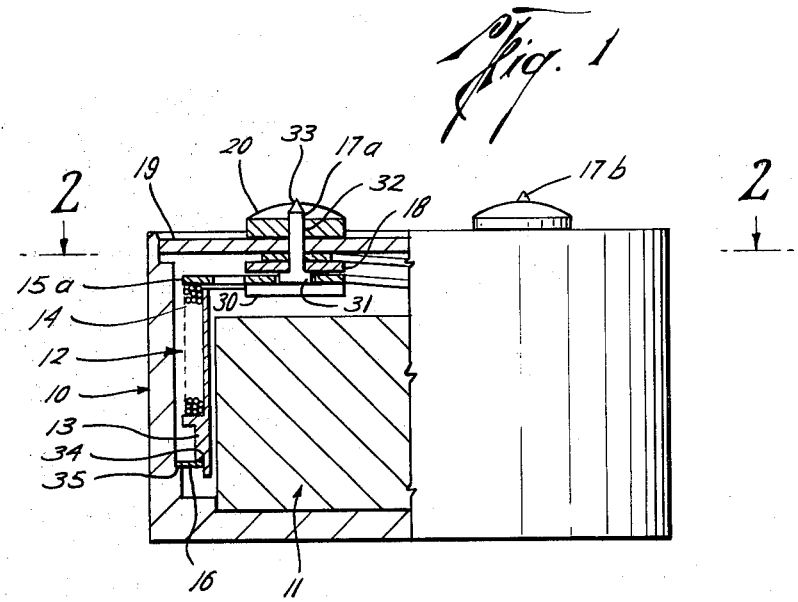
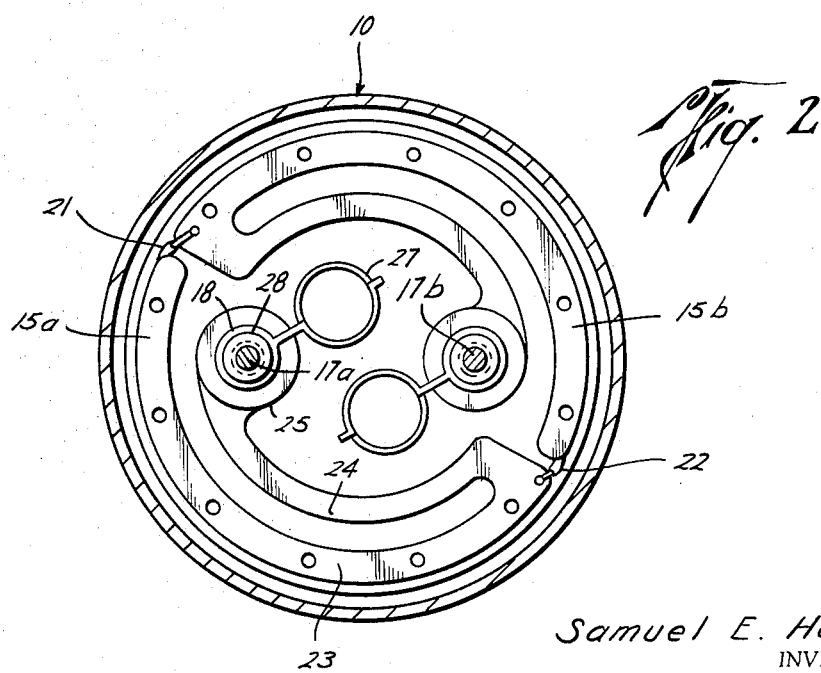
Samuel E. Haggard
INVENTOR.
BY
Robert O White
ATTORNEY May 10, 1966  S. E. HAGGARD  3,251,028
GEOPHONE
Filed Aug. 8, 1963  2 Sheets-Sheet 2
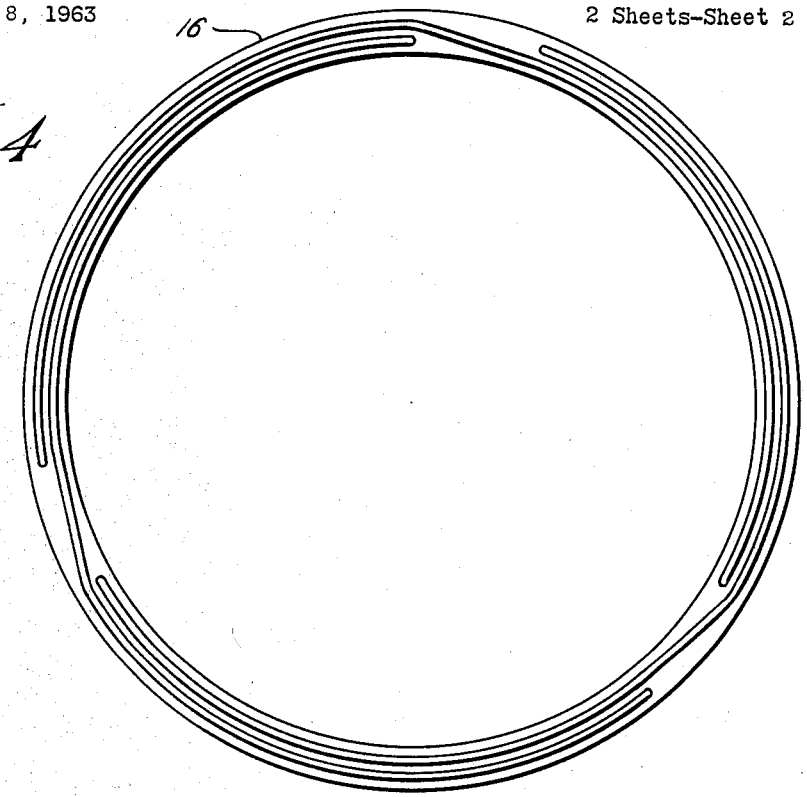
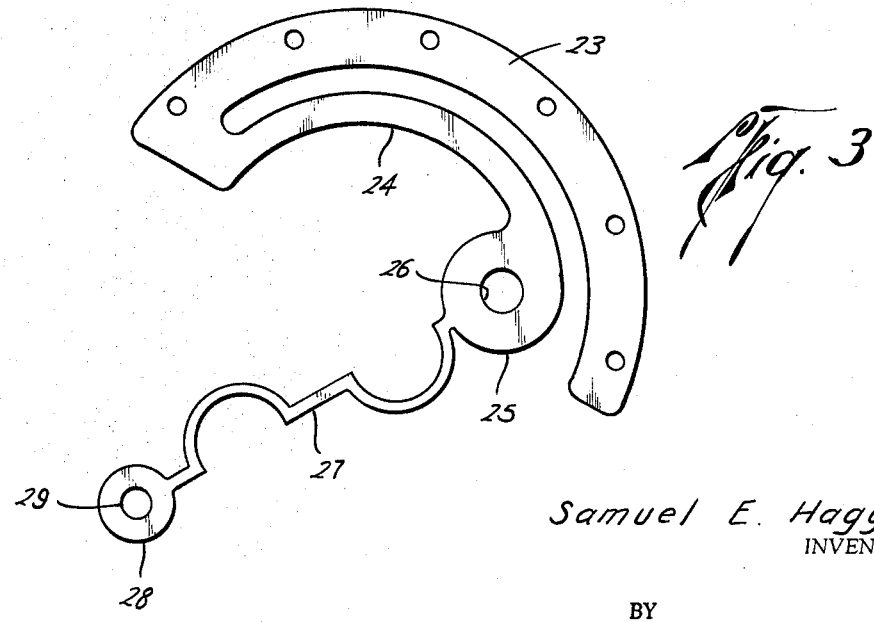
Samuel E. Haggard
INVENTOR.
BY Robert A. White
ATTORNEY

United States Patent Office 3,251,028
Patented May 10, 1966

3,251,028
GEOPHONE
Samuel E. Haggard, Houston, Tex., assignor to Mandrel Industries, Inc., Menlo Park, Calif., a corporation of Michigan
Filed Aug. 8, 1963, Ser. No. 300,761
4 Claims. (Cl. 340—17)

My present invention is in the field of geophysical prospecting, and specifically relates to a geophone of novel design.

In geophysical prospecting, artificially generated seismic energy is introduced into the earth, and the vibrations resulting therefrom are detected at a group of vibration responsive instruments spaced from the point of introduction of the energy. Such instruments are known as geophones or seismometers, and conventionally include a coil suspended within a magnetic field. Relative vibration between the coil and the magnetic force lines as a result of earth tremors induces a voltage in the coil, which voltage is communicated to apropriate recording devices through geophone connecting cables.

Recent years have produced substantial changes in the art of geophysical prospecting, and for purposes of establishing the utility of my invention, it is sufficient to point out that the current trend is toward the use of ever increasing numbers of geophones. Field practices involve the placement of the geophones over extensive ground areas, and maintenance of the desired operating efficiency requires geophones which are light and compact for easy transportation and ready coupling to the earth medium, economical of manufacture to reduce the capital investment in geophones required for each operating crew, and sufficiently rugged to withstand the field usage to which they will be subjected. All of these requirements must be met without sacrifice of the flexibility and sensitivity of response which are necessary for the collection of geophysical data.

Although the foregoing requirements have directed the attention of designers in this field to reduction in size, the limited improvements to date have been accomplished primarily by scaling down the conventional instruments. However, this approach has led to manufacturing problems of increasing severity, and the point has been reached where assembly of the several small elements of the instrument has become so painstaking and tedious as to substantially increase the cost thereof. Parts or subassemblies which once were easy to see, grasp and join to mating parts have become so small during the process of miniaturization that the labor involved in assembling the instruments has greatly increased to the substantial detriment of reliability and manufacturing economy.

In view of the foregoing, one of the primary objects of my invention is to provide a geophone which is reduced in size, weight and cost relative to prior instruments of this type without sacrifice of the necessary operating characteristics.

It is a further object of my invention to provide a geophone the individual elements of which are configured and arranged to reduce the number and complexity of the operations involved in assembly and increase the useful operating life of the resulting instrument.

It is at more specific object of my invention to provide an improved geophone in which the spring suspension system for the coil assembly also provides the avenue for electrically connecting the coil to the output terminals of the instrument, thereby eliminating the difficult problems of assembly resulting from separate mechanical suspension and electrical connection, and increasing the ruggedness of the instrument.

Fulfillment of these and other objects which will become apparent is achieved through a novel approach to geophone design, the presently preferred embodiment of which is illustrated in the attached drawings in which:

FIG. 1 is an elevational view, partially in section, of my improved geophone;

FIG. 2 is a cross-section along lines 2—2 of FIG. 1;

FIG. 3 is one of the two elements which combine in operation to form the top spring for the suspended coil in my geophone, and FIG. 4 is a similar view of the bottom spring of the coil suspension system.

Referring first of FIG. 1, reference numeral 10 indicates the housing or case of the geophone, the same comprising a relatively thin-walled metal cylinder which is closed at the bottom portion thereof. Seated within the case 10 is a cylindrical permanent magnet 11 which fits within a shallow, circular recess in the bottom of the case and preferably is secured by a small amount of adhesive material. The magnet 11 creates a magnetic field within which is suspended the vibrating coil assembly indicated generally by reference numeral 12.

For purposes of description, the coil assembly 12 may be considered to include the cylindrical coil form 13, the multi-layer metallic coil 14 wound thereon, and the two identical elements 15a and 15b which form the top spring. Although the bottom spring 16 might be considered as a part of the coil assembly, the top spring is more intimately so, as will become apparent when the steps in the assembly of the instrument are described.

The coil assembly is suspended within the case 10 by means of the terminals 17a and 17b which are attached to the top spring elements as shall be described hereinafter, each passing through an inner spacer 18, the closure cap 19 and a top spacer 20. The terminal 17a is shown in section in FIG. 1, and terminal 17b is identical.

The cap 19 of the case 10 is formed of an insulating material, preferably a synthetic resin, and a thermal setting composition may be spread over the exposed surface of the cap after it is mounted in the case to complete a moisture proof seal.

Referring now to the manner of assembly of the geophone, it will be apparent that the magnet may be readily secured within the case to form what may be called the magnet assembly. Fabrication of the other of the two major assemblies, the coil assembly, is initiated by winding the coil form 13 with the conductive wire 14, leaving the two ends of the coil indicated by reference numerals 21 and 22 in FIG. 2 exposed. The wire employed in the coil is insulated with a material similar to a hard varnish in the customary manner, but it also is coated with a thermosetting plastic. Thus, after the winding step is performed, the wound coil is heated for a period of time sufficient to bond the thermosetting plastic and make a unit possessing some measure of structural integrity. This feature allows use of a relatively light coil form 13, which leads to better damping qualities.

When the bonded coil has cooled, the two portions of the top spring 15a and 15b are cemented to the top of the coil and coil form as shown in FIGS. 1 and 2. I have found a thermal setting epoxy resin suitable for this purpose. Thereafter, the two ends of the wire coil 21 and 22 are joined, one to each of the two portions 15a and 15b of the top spring. These connections may be made by soldering, and as the top spring elements are of an electrically conductive alloy, the connection of the coil and spring elements becomes both mechanical and electrical.

It should be noted that the foregoing operations are readily accomplished prior to the time of uniting the coil assembly and the magnet assembly. Further, the electrical connection should offer no problems during the life of the instrument, for in the disclosed configuration there is no tendency for the ends of the coil wire to flex relative to the spring elements to which they are joined. This constitutes an obvious improvement over previous units in which the spring suspension system is independent of the electrical connections and the coil wires are joined to the instrument terminals by flexible lengths of wire commonly called pigtails.

Referring now to FIG. 3, there is illustrated the blank form which becomes the element 15a or 15b of the top spring. This part may be fabricated from a relatively thin sheet of alloy by an etching process, and it is designed to contribute to a suspension system of the required frequency characteristics for the instrument's intended use. It comprises an outer leaf 23 and an inner leaf 24. The inner leaf expands into a circular section 25 with a hole 26 through the center. Extending inwardly from the section 25 is the extension 27 which terminates at the circular ear 28.

Prior to assembly, the extension 27 is bent back upon itself as shown in FIGS. 1 and 2 so as to place the ear 28 over the circular section 25 and align the hole 29 in ear 28 with hole 26. The terminal 17a or 17b is inserted upwardly through the aligned holes, so that the relatively large head 30 of the terminal element is below the circular portion 25. The shoulder 31 is received within the hole 26, and the shank 32 passes through the spacer 18, the hole 28, the closure cap 19 and the top spacer 20. It will be observed that the upper ends 33 of the terminals provide points for electrical connection to the conductor cable, not shown, which will join the instrument into the recording system.

It should be noted that the ear 28 is firmly secured between spacer 18 and cap 19, but the circular portion 25 is only loosely restrained. Flexibility is provided by the fact that the longitudinal dimension of shoulder 31 is somewhat greater than the thickness of the spring material, and my experience has indicated that this arrangement frees the unit from undesirable electrical noise during operation.

All of the steps described above are performed prior to placing the coil assembly within the magnet assembly. Incident to uniting the two major asemblies, the bottom spring 16 is placed in position below the external shoulder 34 of the coil form 13 to rest upon the internal shoulder 35 of the case 10.

Relatively unskilled personnel can assemble my geophone quickly and easily, and the instrument is ready for testing as soon as the coil assembly is in place. Further, it is not necessary to seal the closure cap 19 on the case 10 until testing has been completed and the instrument approved.

It may be noted that the bottom spring illustrated in FIG. 4 may be fabricated by an etching process similar to that employed for the top spring elements. However, it has no electrical function, but serves merely to contribute to the elastic suspension system for the vibrating coil assembly. Thus, its spring characteristics are correlated with those of the top spring elements to achieve the desired design goals.

It will be apparent that I have provided a geophone which will accomplish all of the objectives aforesaid, and those skilled in the art will immediately see many obvious ways of utilizing the principles of my invention. Consequently, I desire to protect by Letters Patent all embodiments thereof which fall within the scope of the following claims.

I claim:
1. In a geophone, the combination comprising
 (a) a housing,
 (b) a cap member removably secured atop said housing,
 (c) a permanent magnet secured within said housing,
 (d) a coil assembly suspended within said housing for relative movement within the magnetic field of said magnet, said coil assembly comprising a coil of electrically conductive wire and a dual element spring secured atop said coil, said dual elements being of electrically conductive material and each electrically connected to an end of said coil, and
 (e) a pair of terminal elements of electrically conductive material, each securing one of said dual elements below said cap, and extending therethrough to provide a junction point on the outer side thereof.

2. A geophone comprising
 (a) an open-topped cylindrical housing,
 (b) a cap of insulating material closing the top of said housing,
 (c) a pair of electrically conductive terminal elements extending through said cap,
 (d) a permanent magnet secured within said housing,
 (e) a coil assembly surrounding said magnet within said housing and suspended from and electrically connected to said terminal elements, said coil assembly comprising a coil of electrically conductive wire and a pair of electrically conductive spring elements secured thereto and to said terminal elements, and electrically connected one to each end of said coil.

3. A geophone comprising
 (a) a permanent magnet,
 (b) a coil of electrically conductive wire surrounding said magnet within the magnetic field thereof,
 (c) a pair of spring elements secured to said coil and electrically connected, one to each end of said coil,
 (d) a housing enclosing said coil and magnet and securing the latter relative thereto, and
 (e) a pair of electrical terminals extending through said housing and secured one to each of said spring elements for electrical connection to and mechanical suspension of said coil.

4. In a geophone, the combination comprising
 (a) an open-topped cylindrical housing,
 (b) a cap member of insulating material removably secured atop said housing,
 (c) a cylindrical permanent magnet secured within said housing in a coaxial spaced relationship,
 (d) a coil assembly suspended within said housing about said magnet, said coil assembly comprising a cylindrical coil form, a coil of electrically conductive wire wound about said coil form, and a dual element spring secured atop said wound coil form, said dual elements being of electrically conductive material and each electrically connected to an end of said coil, and
 (e) a pair of terminal elements of electrically conductive material extending through said cap, each suspending one of said dual elements therebelow and providing a junction point on the upper side thereof.

No references cited.

BENJAMIN A. BORCHELT, *Primary Examiner.*

P. A. SHANLEY, *Assistant Examiner.*